United States Patent [19]
Shoji et al.

[11] Patent Number: 6,064,549
[45] Date of Patent: May 16, 2000

[54] FLEXIBLE MAGNETIC DISC APPARATUS HAVING AN ELASTIC LOADING MECHANISM PORTION

[75] Inventors: Kenji Shoji; Kazuya Oda; Yasutaka Mizutani, all of Tokyo, Japan

[73] Assignee: Mitsubishi Denki Kabushiki Kaisha, Tokyo, Japan

[21] Appl. No.: 09/076,805

[22] Filed: May 13, 1998

[30] Foreign Application Priority Data

Oct. 29, 1997 [JP] Japan ..................................... 9-296563

[51] Int. Cl.$^7$ .................................................. G11B 17/02
[52] U.S. Cl. ......................................................... 360/99.02
[58] Field of Search .............................. 360/97.01, 99.01, 360/99.02, 99.03, 133; 369/75.1, 75.2, 77.1, 77.2

[56] References Cited

U.S. PATENT DOCUMENTS

| 4,688,125 | 8/1987 | Nomoto et al. ....................... 360/99.02 |
| 5,220,520 | 6/1993 | Kessoku ................................. 364/708 |
| 5,331,499 | 7/1994 | Marcusen ............................... 360/133 |
| 5,610,655 | 3/1997 | Wakabayashi et al. ................ 348/373 |

FOREIGN PATENT DOCUMENTS

| 57-90828 | 6/1982 | Japan . |
| 62-180579 | 8/1987 | Japan . |
| 4-154013 | 5/1992 | Japan . |

*Primary Examiner*—Jefferson Evans

[57] ABSTRACT

A flexible magnetic disc apparatus comprising a magnetic head portion for recording and reproducing a disc-shaped recording medium and a loading mechanism portion for loading and unloading the recording medium and having a button portion. When the recording medium is loaded, the button portion projects from a panel surface of the flexible magnetic disc apparatus in a first direction. When the button portion is depressed in a second direction opposite to the first direction, the button portion causes the loading mechanism portion to unload the recording medium. The button portion is capable of being elastically deformed in a direction other than the first direction and may be rubber which has a rubber hardness of a range of from 80 to 100. The button portion may be a cylindrical member having a diameter of from 1.0 mm to 3.0 mm and a distance of projection of the button portion being from 3.0 mm to 5.0 mm.

19 Claims, 9 Drawing Sheets

FLEXIBLE MAGNETIC DISC APPARATUS HAVING AN ELASTIC LOADING MECHANISM PORTION

BACKGROUND OF THE INVENTION

The present invention relates to a flexible magnetic disc apparatus capable of loading and unloading a disc-shaped recording medium and, more particularly to, a flexible magnetic disc apparatus having a recording medium unloading mechanism for unloading a recording medium.

FIG. 9 is a perspective view showing an information processing apparatus in which a conventional flexible magnetic disc apparatus disclosed in Japanese Patent Laid-Open No. 62-180579, for example, is installed. In FIG. 9, reference numeral 50 is a disc-shaped recording medium, 51 is a flexible magnetic disc apparatus (which may sometimes be referred to as FDD) arranged for loading and unloading the recording medium 50 and for recording and reproducing information in connection with the loaded recording medium 50, 52 is a cover for protecting a recording medium insertion port of the FDD 51, 53 is a personal computer which is an information processing apparatus instructing the FDD 51 to record the information on the recording medium 50 or instructing the FDD 51 to reproduce the recording information from the recording medium 50. The personal computer 53 comprises the flexible magnetic disc apparatus 51 and the cover 52 as its components.

The operation will now be described. FIG. 10 is an explanatory view showing the opening and closing operation of the cover, FIG. 11a is an explanatory view showing the position of a button portion of the flexible magnetic disc apparatus with the recording medium loaded and FIG. 11b is an explanatory view showing the position of a button portion of the flexible magnetic disc apparatus before the recording medium is loaded. In FIGS. 10, 11a and 11b, the same reference numerals designate identical or corresponding components as those shown in FIG. 9 so that their explanations will be omitted. On FIG. 10, 53a is a FDD protective space provided in the personal computer 53 and arranged in such a manner that it covers the space for a button portion 51a (see FIGS. 11a and 11b) disposed in a recording medium unloading mechanism (not shown).

Also, reference numeral 54 is a hinge loading portion provided on the personal computer 53 for rotatably supporting the cover 52 in directions A and B.

In FIGS. 11a and 11b, 51a is a button portion disposed in a recording medium unloading mechanism (not shown) for loading and unloading the recording medium 50 (see FIG. 10) relative to the FDD 51. The button portion 51a is caused to project by a predetermined length by the recording medium unloading mechanism when the recording medium 50 is loaded, and when the projecting portion is depressed in the direction opposite to the direction of projection, the recording medium 50 is unloaded by the recording medium unloading mechanism. Reference characters C shows the direction in which the recording medium 50 is loaded and D shows the direction in which the recording medium 50 is unloaded.

In order to load the recording medium 50 to FDD 51, the cover 52 is opened to allow the recording medium 50 to be inserted into the recording medium insertion port (not shown) and the recording medium 50 is moved in the direction C to load it into the FDD 51 through the recording medium insertion port.

At this time, the button portion 51a is moved within the FDD protective space 53a from the position prior to the medium insertion as shown in FIG. 11b to the position after the medium insertion as shown in FIG. 11a. That is, the button portion 51a is projected in the unloading direction D by a predetermined distance by the recording medium unloading mechanism.

Thereafter, the cover 52 is closed so that the button portion 51a is not subjected to an unintended external force such as when caught by something.

When it is desired to unload the recording medium 50 from the FDD 51, the cover 52 is opened and the button portion 51a is depressed into the loading direction C by a predetermined distance. The depression of the button portion 51a causes the recording medium unloading mechanism (not shown) with which the button portion 51a is provided to move the recording medium into the unloading direction D to unload the recording medium 50 from the FDD 51.

In the conventional flexible magnetic disc apparatus or FDD 51, in order to prevent the button portion 51a from being damaged or the recording medium unloading mechanism from being damaged by an unintended external force exerted upon the button portion 51a, or the button portion 51a from being depressed in the loading direction C by an unintended external force and accidentally unload the recording medium 50, the provision is made of the cover 52 and the FDD protective space 53a so that the unintended external force is not applied to the button portion 51a. Therefore, the miniaturization of the personal computer 53 is difficult.

SUMMARY OF THE INVENTION

Accordingly, an object of the present invention is to provide a flexible magnetic disc apparatus free from the above-discussed problems of the conventional flexible magnetic disc apparatus.

Another object of the present invention is to provide a flexible magnetic disc apparatus in which the damages of the button portion and the damages to the recording medium unloading mechanism can be prevented.

Another object of the present invention is to provide a flexible magnetic disc apparatus in which the damages of the button portion and the damages to the recording medium unloading mechanism can be prevented and which can be made small-sized.

With the above objects in view, the flexible magnetic disc apparatus of the present invention comprises a magnetic head portion for recording and reproducing information with respect to a disc-shaped recording medium, a carriage portion for positioning the magnetic head portion at a predetermined track position of the recording medium, a frame having a medium loading portion for loading the recording medium thereon, a medium driving motor for rotating the recording medium, and a loading mechanism portion for loading and unloading the recording medium and having a button portion. When the recording medium is loaded in the loading mechanism portion, the button portion projects from a panel surface of the flexible magnetic disc apparatus in a first direction by a predetermined length. When the button portion is depressed in a second direction opposite to the first direction, the button portion causes the loading mechanism portion to unload the recording medium. The button portion is an elastic member capable of being elastically deformed in a direction other than the first direction.

The button portion may be made of rubber or the rubber may have a rubber hardness of a range of from 80 to 100. The button portion may be a cylindrical member having a diameter of from 1.0 mm to 3.0 mm and a central axis extending along the first direction, a distance of projection of the button portion being from 3.0 mm to 5.0 mm.

The button portion may also be made of rubber having a rubber hardness of a range of from 90 to 95. The button portion may be a cylindrical member having a diameter of from 2.0 mm to 2.5 mm and a central axis extending along the first direction, a distance of projection of the button portion being from 3.5 mm to 4.5 mm.

Alternatively, the flexible magnetic disc apparatus of the present invention may comprise a magnetic head portion for recording and reproducing information with respect to a disc-shaped recording medium, a carriage portion for positioning the magnetic head portion at a predetermined track position of the recording medium, a frame having a medium loading portion for loading the recording medium thereon, a medium driving motor for rotating the recording medium, and a loading mechanism portion for loading and unloading the recording medium and having a button portion. When the recording medium is loaded in the loading mechanism portion, the button portion projects from a panel surface of the flexible magnetic disc apparatus in a first direction by a predetermined length. When the button portion is depressed in a second direction opposite to the first direction, the button portion causes the loading mechanism portion to unload the recording medium. The loading mechanism portion comprises a shaft portion supported from the frame and movable in the first direction and an elastic member secured at its one end to a projecting end of the shaft portion and secured at its the other end to the button portion and capable of being elastically deformed in a direction other than the first direction.

The elastic member may comprise a spring having one end secured to the projecting end of the shaft portion and the other end secured to the button portion. The elastic member comprises a cylindrical coil spring having its central axis in alignment with a shaft of movement of the shaft portion and having one end secured to the projecting end of the shaft portion and the other end secured to the button portion. The elastic member may comprise a leaf spring having one end secured to the projecting end of the shaft portion and the other end secured to the button portion.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
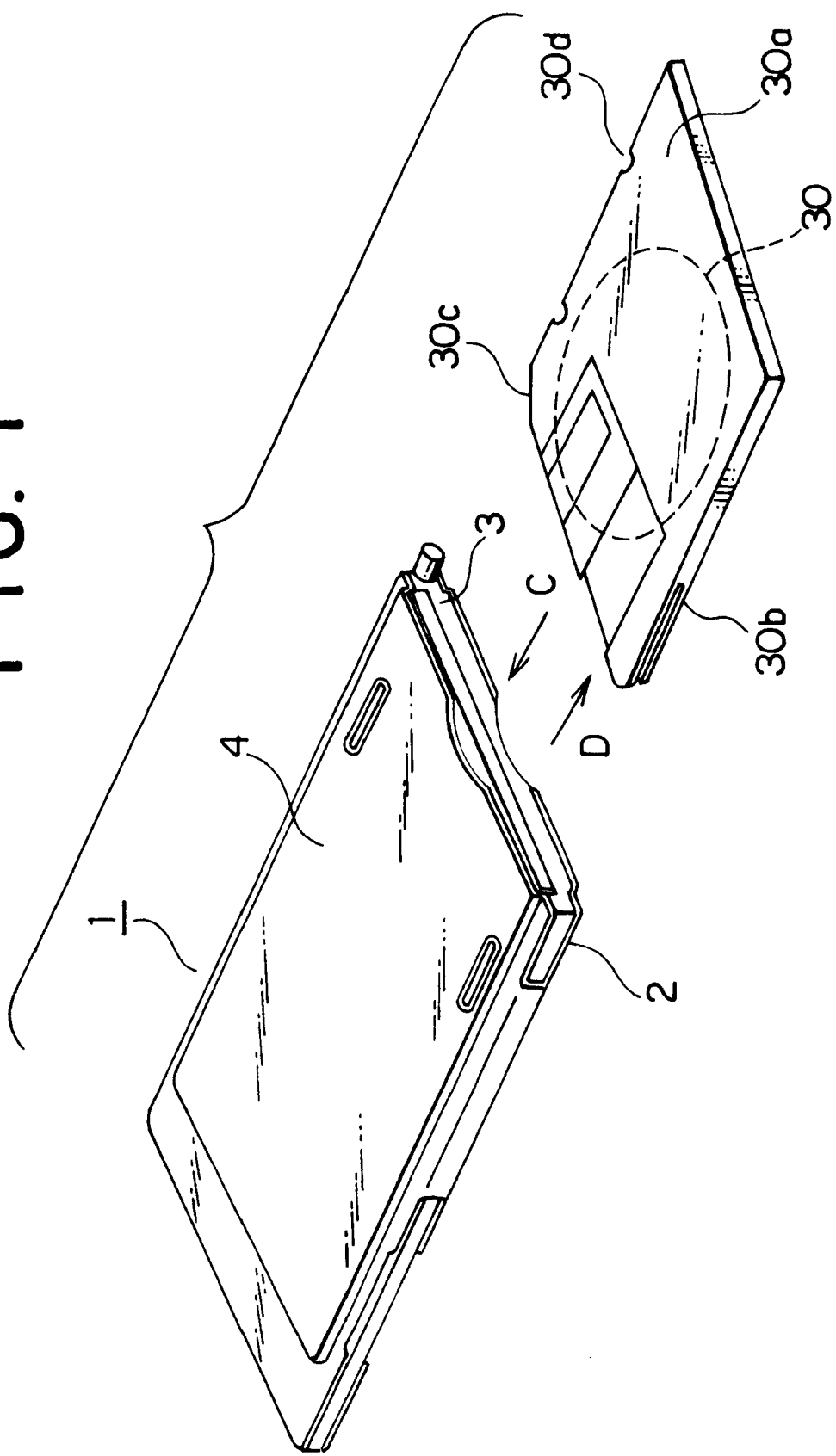
FIG. 1 is an explanatory perspective view of the flexible magnetic disc apparatus of one embodiment of the present invention.
Figure 2:
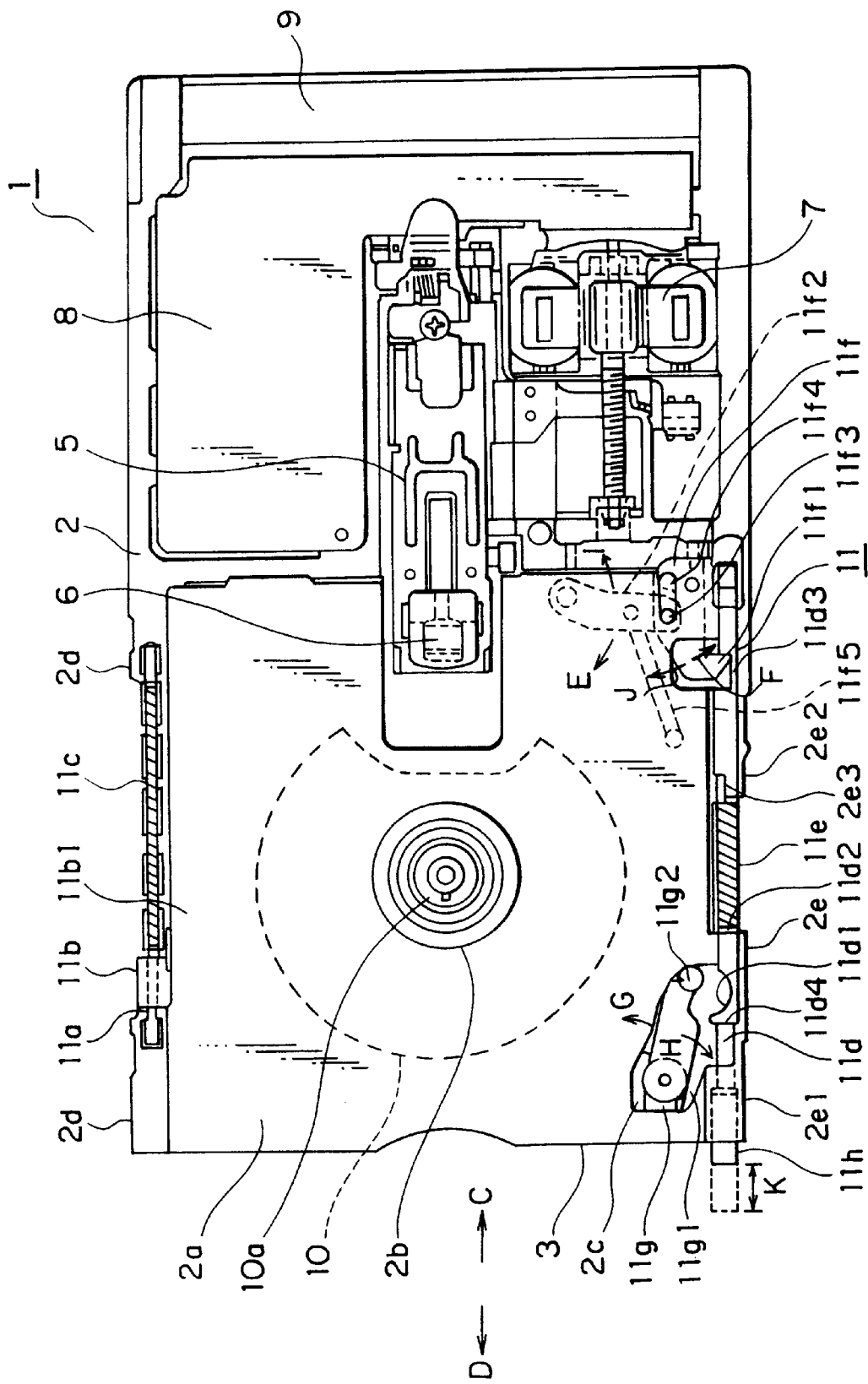
FIG. 2 is a plan view of the flexible magnetic disc apparatus shown in FIG. 1.

FIG. 1 is an explanatory perspective view of the flexible magnetic disc apparatus of one embodiment of the present invention and FIG. 2 is a plan view of the flexible magnetic disc apparatus shown in FIG. 1. In FIGS. 1 and 2, reference numeral 30 is a disc-shaped recording medium housed within a recording medium protective cartridge 30a made of a resin. The recording medium 30 has a diameter of 1.7 inches. Also, the recording medium protective cartridge 30a for housing the recording medium 30 has a width of about 47 mm, a length of about 50 mm, a thickness of about 2 mm, which are significantly smaller than those of the conventional protective cartridge (not shown) for housing the recording medium (not shown) of a diameter of 3.5 inches generally used which has a width of 90 mm, a length of 95 mm and a thickness of 3 mm.

Figure 9:
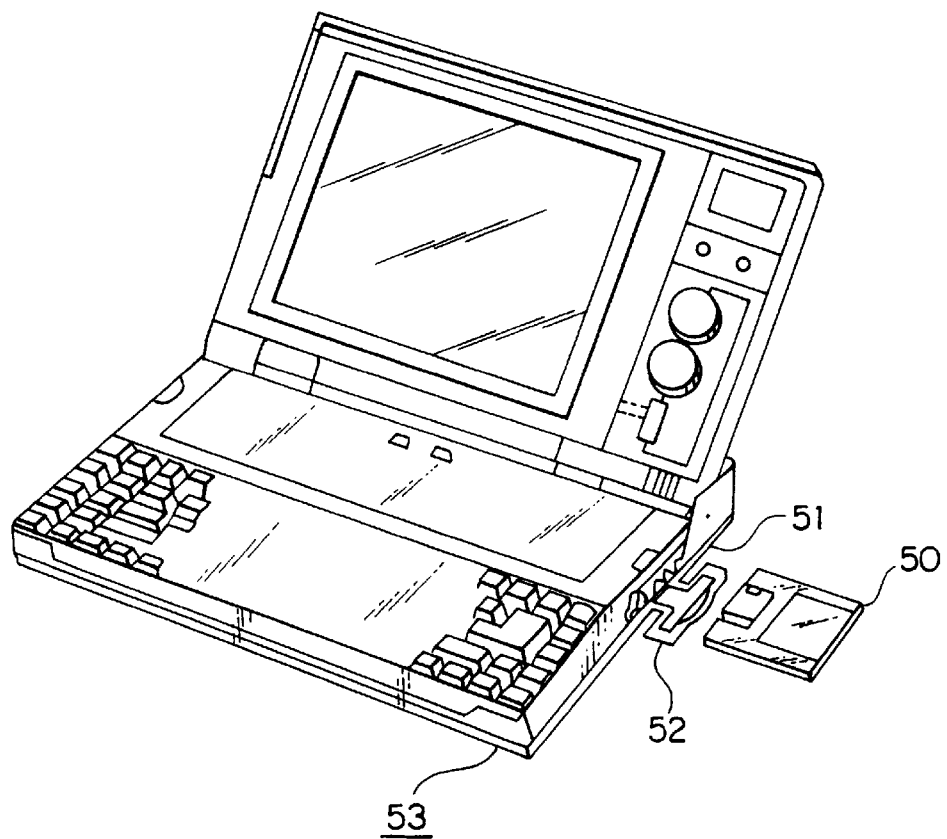
FIG. 9 is a perspective view of a conventional flexible magnetic disc apparatus mounted to a personal computer.
Figure 10:
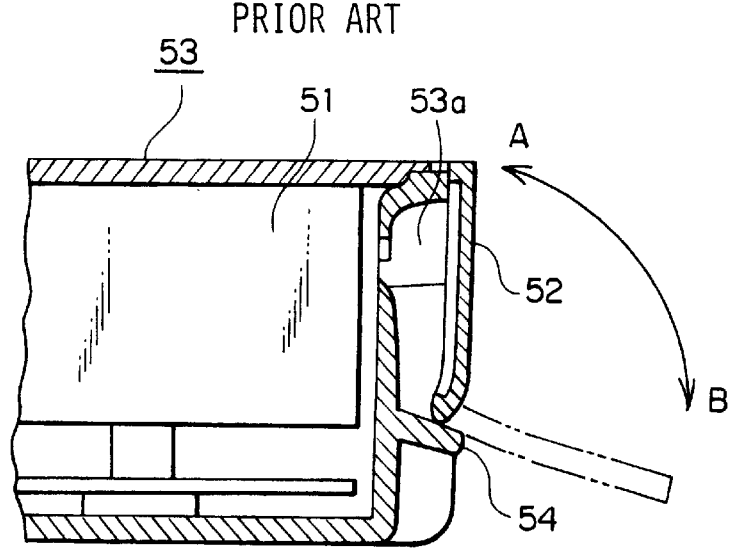
FIG. 10 is a fragmental sectional view of the flexible magnetic disc apparatus showing how the cover shown in FIG. 9 is operated.

The reference numeral 1 is a flexible magnetic disc apparatus (also referred to as an FDD hereinafter), which is arranged such that the recording medium 30 is capable of being loaded and unloaded, for recording the information on the loaded recording medium 30 or reproducing the recorded information. Reference numeral 2 is a frame of the FDD 1, reference numeral 3 is the panel surface provided on the frame 2 and reference numeral 4 is a cover of the FDD 1 and attached to the frame 2. The FDD 1 has a width of about 55 mm, a length of about 90 mm and a thickness of about 5 mm, which are significantly smaller than a width of 100 mm, a length of 150 mm and a thickness of 25 mm of the conventional flexible magnetic disc apparatus 51 shown in FIG. 9.

In FIG. 2, reference numeral 2a is a recording medium loading portion provided in the frame 2 for loading the recording medium 30 in a predetermined position. Reference numeral 2b is a through hole portion disposed in the frame 2 in which a hub portion 10a is to be inserted. Reference numeral 2c is a recessed portion formed in the recording medium loading portion 2a, reference numeral 2d is a guide securing portion disposed in the frame 2 at one side of the recording medium loading portion 2a for securing the guide portion 11a. Reference numeral 2e is a shaft support portion disposed in the frame 2 on the other side of the recording medium loading portion 2a and comprises a through hole portion 2e1 extending through it in the direction of the loading direction C or the unloading direction D, a groove portion 2e2 extending along the loading direction C or the unloading direction D and an engaging portion 2e3, thereby movably supporting the shaft portion 11d along the loading direction C or the unloading direction D.

The reference numeral 5 is a carriage mechanism portion disposed on the frame 2 and is movable in the direction of the diameter of the recording medium 30, the carriage mechanism portion 5 has secured on its one end a magnetic head portion 6 for recording information or for reproducing the recorded information relative to the recording medium 30. Reference numeral 7 is a stepping drive motor secured to the frame 2 for stepping movement of the carriage mechanism portion 5 by a predetermined distance in the direction of diameter of the recording medium 30.

The reference numeral 8 is a control portion for controlling the commands of recording or reproducing the information to the magnetic head portion 6. Reference numeral 9 is an interface portion electrically connected to the control portion 8 for transmitting and receiving signals to and from an external device. Reference numeral 10 is a recording medium drive motor disposed on the frame 2 for rotating the recording medium 30 held by the hub portion 10a. The recording medium drive motor 10 has its stator (not shown), the rotor (not shown), the coil (not shown) wound on the stator disposed on the back side of the recording medium loading portion 2a and only the hub portion 10a is inserted into the through hole portion 2b for holding the recording medium 30 thereon.

The reference numeral 11 is a loading mechanism portion which is a recording medium unloading mechanism portion for loading and unloading the recording medium 30 and is in the shape of a cylinder of a diameter of about 2.0 mm or so for guiding the engaging portion 11b along the loading direction C or the unloading direction D. Reference numeral 11b is an engaging portion having a through hole extending through in the loading direction C or the unloading direction D and has the guide portion 11a extended through its through hole, thereby arranged to be movable along the guide portion 11a by a pawl portion 11b1 engaging with the groove portion 30b of the recording medium 30. Reference numeral 11c is a spring portion disposed to bias the engaging portion 11b against the unloading direction D.

The reference numeral 11d is a shaft portion supported by the shaft support portion 2e so as to be movable along the loading direction C and the unloading direction D of the recording medium 30. The shaft portion 11d also achieves the positioning and the release of the positioning of the recording medium 30. Reference numeral 11d1 is a recessed portion disposed in the shaft portion 11d to open toward the side of the guide portion 11a. The recessed portion 11d1 is tapered at the respective ends on the loading direction C side and the unloading direction D side.

The reference numeral 11d2 is a spring receiving portion disposed on the shaft portion 11d and is biased by the spring portion 11e in the unloading direction D. Reference numeral 11d3 is a notch portion formed in the shaft portion 11d, the notch being formed to open toward the guide portion 11a and is engaged by the latch claw portion 11f1 when the recording medium 30 is not loaded. Reference numeral 11d4 is a stopper for preventing the falling off of the shaft portion 11d in the unloading direction D from the shaft support portion 2e.

The reference numeral 11e is a spring portion having one end abutting against the spring receiving portion 11d2 and the other end abutting against the engaging portion 2e3 such that the shaft portion 11d is urged against the unloading direction D. In this embodiment, the bias force of the spring portion 11e is set to be about 1.5 N (Newton).

The reference numeral 11f is a latch portion having a latch pawl portion 11f1 which is rotatably supported from the frame 2 and which, upon unloading of the recording medium 30, engages the notch portion 11d3 to prevent the shaft portion 11d from being moved in the unloading direction D.

Reference numeral 11f2 is a latch restriction plate disposed on the latch portion 11f and having one end rotatably supported to the frame 2. Reference numeral 11f3 is a latch pin disposed on the other end of the latch restriction plate 11f2 and projecting above the recording medium loading portion 2a and engages an elongated hole 11f4 formed in the latch pawl portion 11f1. Reference numeral 11f5 is a spring portion disposed on the latch portion 11f for always urging the latch restriction plate 11f2 to rotate in a direction indicated by an arrow E.

Since the latch restriction plate 11f2 is always urged to rotate in the direction of the arrow E by the spring portion 11f5, the latch pin 11f3 always urges the latch pawl portion 11f1 to rotate in the direction shown by an arrow F through the engagement against the end of the elongated hole 11f4 at the side of the unloading direction D.

The reference numeral 11g is a stopper portion rotatably supported by the frame 2 within the recess portion 2c and urged by the leaf spring 11g1 to rotate in a direction of an arrow G. The stopper portion 11g maintains the recording medium 30 at a predetermined position by the pin 11g2 on one end thereof being pressed against the shaft portion 11d.

The reference numeral 11h is a button portion made of an elastic member which, in the illustrated embodiment, is a rubber material having a rubber hardness within a predetermined hardness range according to the spring type hardness test (type A) prescribed by the Japanese Industrial Standard (JIS K 6301). The rubber material is made cylindrical in shape and secured to a projecting end portion of the shaft portion 11d, that is, the side of the unloading direction D of the shaft portion 11d. With a rubber material having a rubber hardness Hs of a range from 80 to 100, the dimensions of the button portion 11h may for example have a diameter of 1.0 mm–3.0 mm, a length of projection from the panel surface 3 (i.e., the length of the unloading direction D) of 3.0 mm–5.0 mm.

When a rubber material having a rubber hardness Hs of a range from 90 to 95 is used, the dimensions of the button portion 11h may for example include a diameter of 2.0 mm–2.5 mm, a length of projection from the panel surface 3 (i.e., the length of the unloading direction D) of 3.5 mm–4.5 mm.

By combining the rubber hardness Hs and the dimensions of the button portion 11h within the above ranges, the arrangement can be such that, when the button portion 11h is pressed in the loading direction C, the pressing force can be transmitted to the shaft portion 11d and that, when the button portion 11h is pressed in a direction other than the loading direction C, the button portion 11h can be elastically deformed in that direction other than the loading direction C.

In the illustrated embodiment, the rubber material having a rubber hardness Hs of from 90–95 is used and the button portion 11h has a cylindrical shape of a diameter of about 2.2 mm and a projection length of about 4.0 mm. By selecting the rubber hardness and the dimensions of the button portion 11h in this manner, even when the thickness of the FDD 1 is only 5 mm, an optimum area for pushing the button portion 11h as well as a projection length of the button portion 11h necessary for carrying out the unloading operation of the recording medium 30 can be ensured and, when the button portion 11h is pressed in the loading direction C, the pressing force is effectively transmitted to the shaft portion 11d and, when the button portion 11h is pressed in a direction other than the loading direction C, the button portion 11h can be easily elastically deformed in that direction other than the loading direction C.

It is to be noted that the loading mechanism portion 11 includes the components designated by the reference numerals 11a–11h and the FDD 1 comprises the components designated by the reference numerals 2–11.

Figure 3:
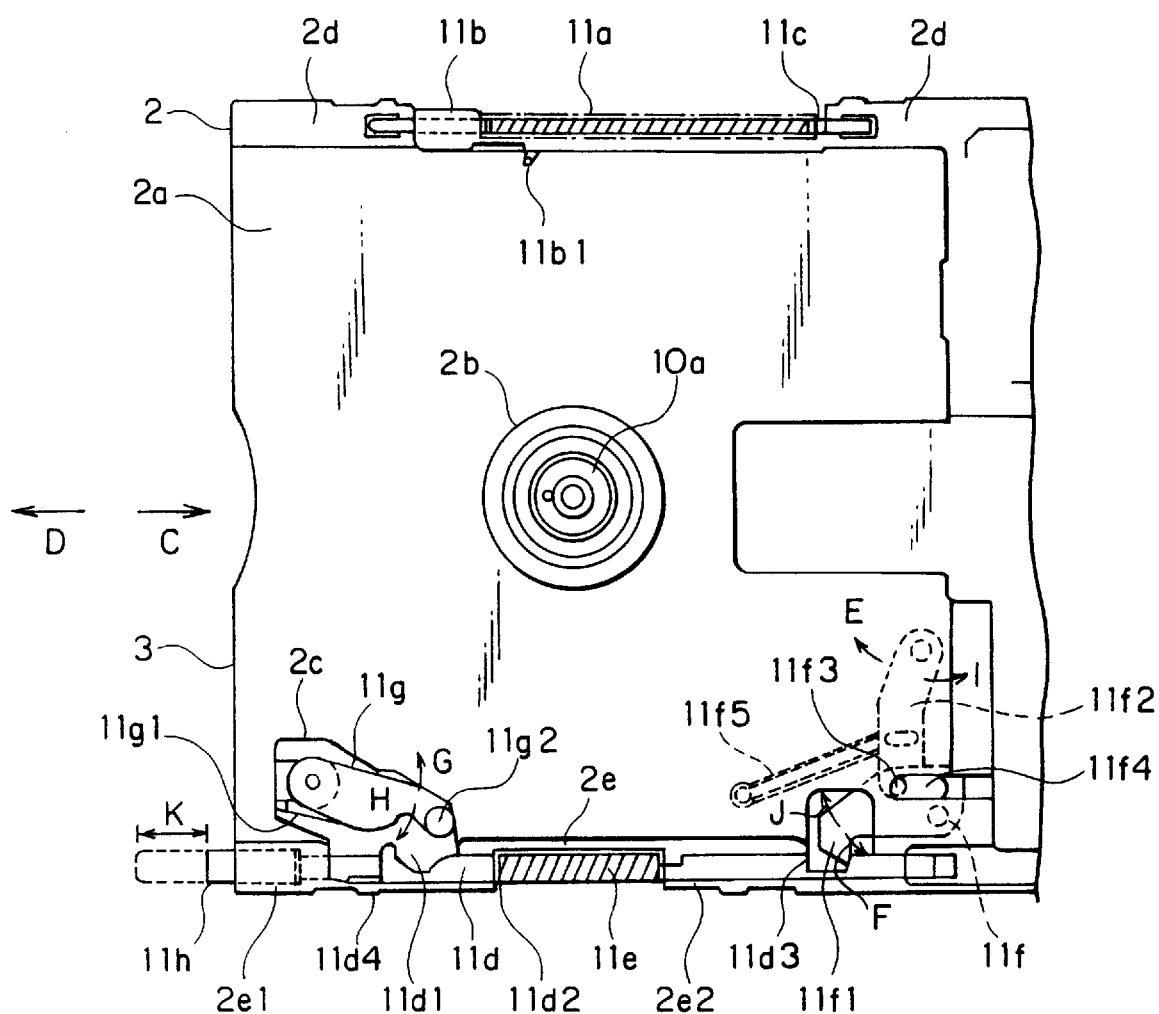
FIG. 3 is an explanatory plan view showing the flexible magnetic disc apparatus before the recording medium is loaded.
Figure 4:
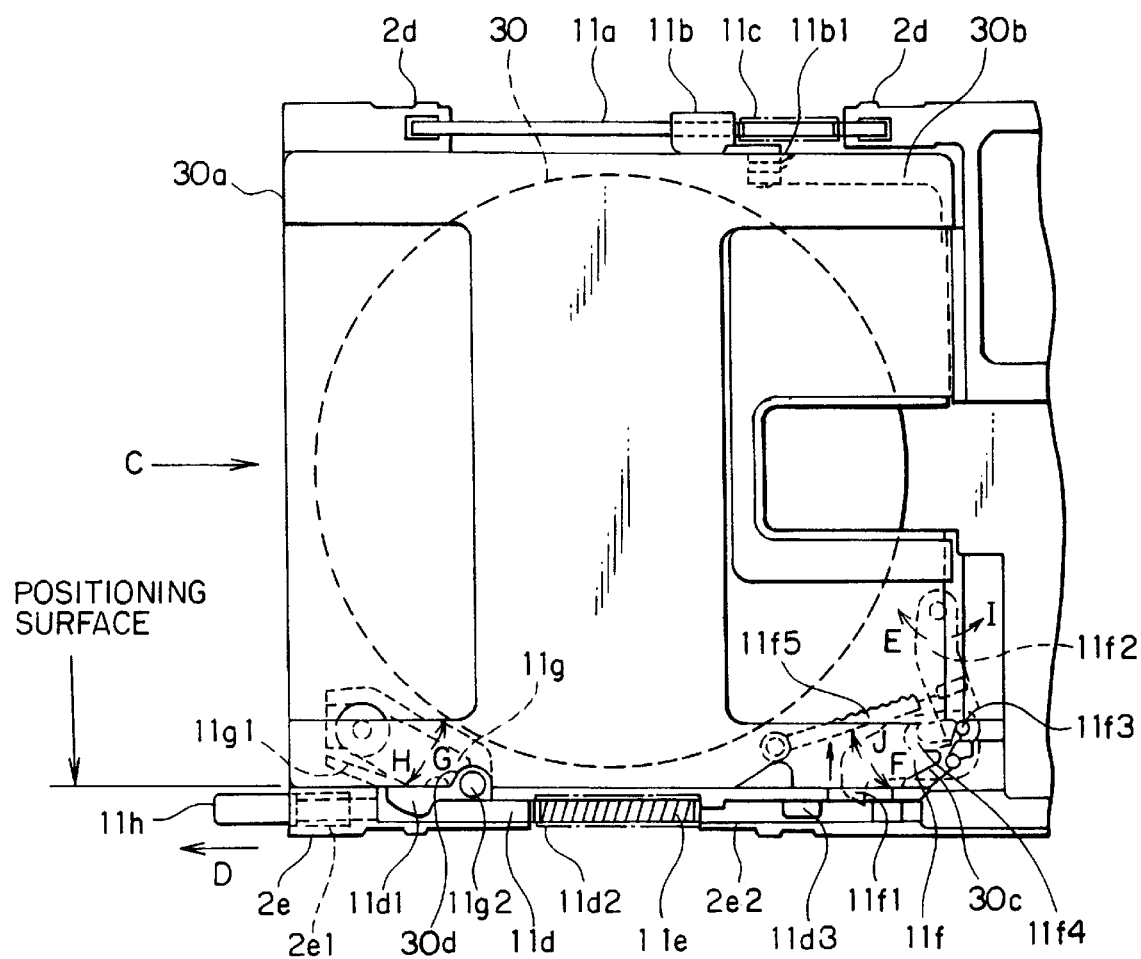
FIG. 4 is an explanatory plan view showing the flexible magnetic disc apparatus with the recording medium loaded.
Figure 5:
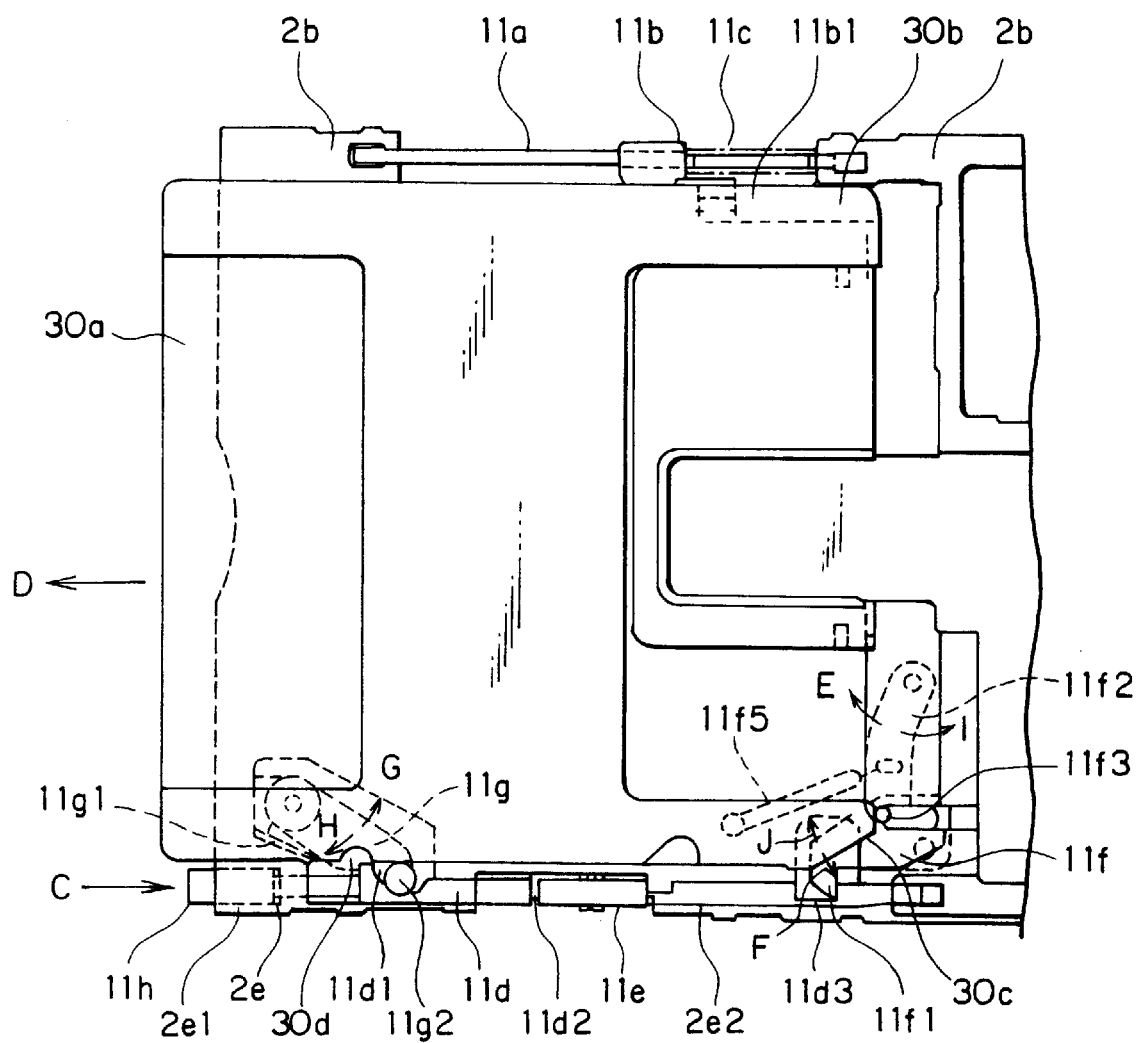
FIG. 5 is an explanatory plan view showing the flexible magnetic disc apparatus with the recording medium being unloaded.
Figure 6:
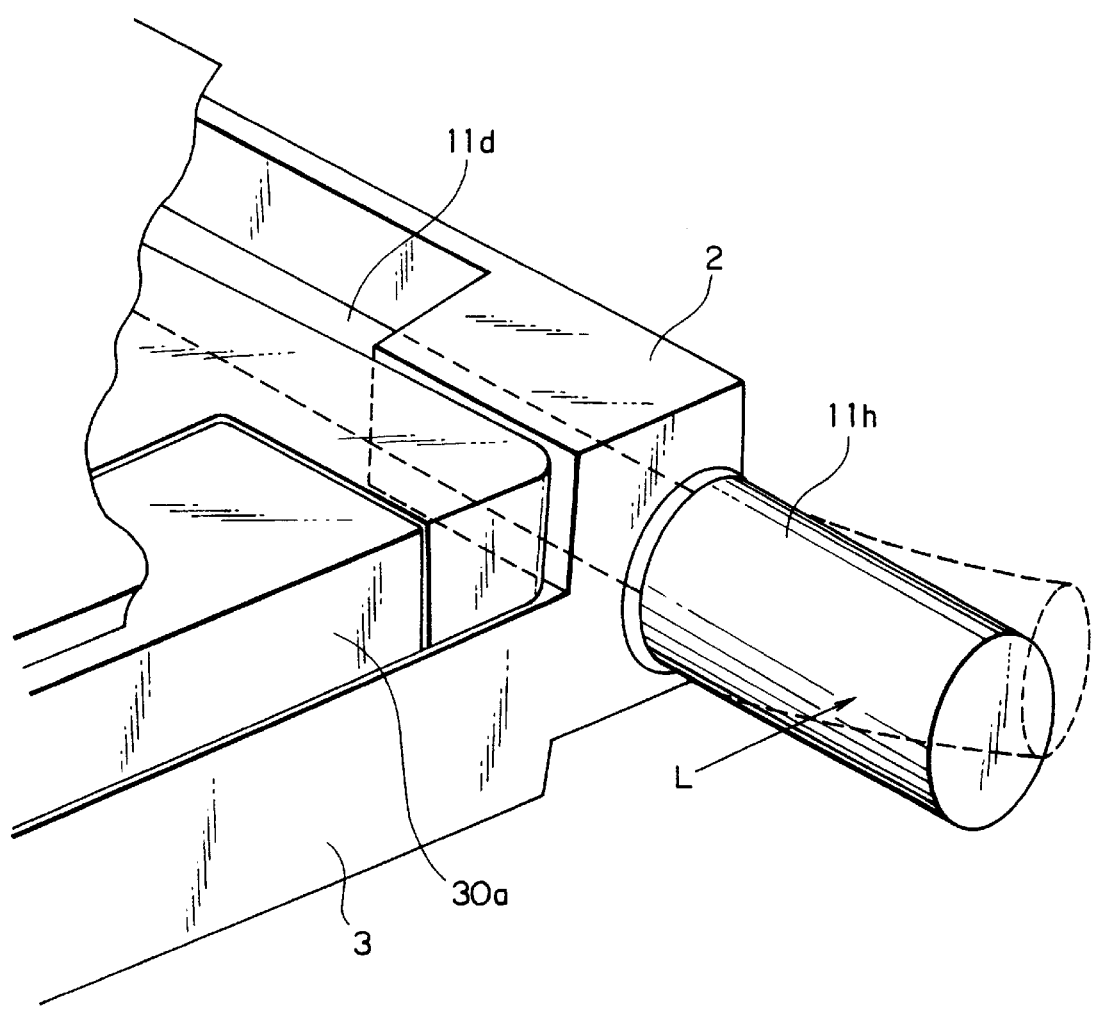
FIG. 6 is an explanatory perspective view of the button portion showing the function of the button portion against an unnecessary external force.

The operation of the flexible magnetic disc apparatus of the present invention will now be described. FIGS. 3, 4 and 5 are views for explaining the loading operation and FIG. 3 being an explanatory plan view showing the flexible magnetic disc apparatus before the recording medium is loaded, FIG. 4 being an explanatory plan view showing the flexible magnetic disc apparatus with the recording medium loaded and FIG. 5 being an explanatory plan view showing the flexible magnetic disc apparatus with the recording medium being unloaded. FIG. 6 is an explanatory perspective view of the button portion showing the function of the button portion against an unnecessary external force. The reference numerals identical to or the same as those in FIGS. 1 and 2 designate identical or corresponding components and their explanation will be omitted.

The loading operation of the recording medium 30 will now be described. As shown in FIG. 3, when there is no recording medium 30, the shaft portion 11d is prevented from being moved by the latch portion 11f and is positioned in the loading direction C. Also, the engaging portion 11b is urged in the unloading direction D by the spring portion 11c and is positioned in the unloading direction D.

When the recording medium 30 is inserted into the FDD 1 in the loading direction C from the panel surface 3, the groove portion 30b formed in one side of the recording medium protective cartridge 30a engages the pawl portion 11ba of the engaging portion 11b to move the engaging portion 11b in the loading direction C against the biasing force of the spring portion 11c.

The taper portion 30c on the other side of the recording medium protective cartridge 30a engages the pin 11g2 of the stopper portion 11g and the slope of the tapered portion 30c causes the stopper portion 11g to rotate in the direction of the arrow H against the spring force of the leaf spring 11g1. This rotation causes the pin 11g2 to be accommodate within the recessed portion 11d1 of the shaft portion 11d.

When the recording medium 30 is inserted further, the recording medium 30 abuts against the latch pin 11f3 of the latch portion 11f to push the latch pin 11f3 to the loading direction C. Since this latch pin 11f3 is mounted on the latch restriction plate 11f2 rotatable supported on the frame 2, the latch restriction plate 11f2 rotate in the direction of an arrow I against the spring force of the spring portion 11f5.

The further insertion of the recording medium 30 causes the latch pin 11f3 to abut against the end on the loading direction C side of the elongated hole 11f4, releasing the engagement with the notch portion 11d3. The shaft portion 11d, when the engagement between the latch pawl portion 11fa and the notch portion 11d3 is released, moves in the unloading direction D due to the spring force of the spring portion 11e. At this time, the button portion 11b secured to the projecting end portion of the shaft portion 11d projects from the panel surface 3 by a predetermined length K, which is 3 mm in the illustrated embodiment.

As the shaft portion 11d moves in the unloading direction D, the pin 11g2 of the stopper portion 11g moves along the taper portion of the recessed portion 11d1 to come out of the recessed portion 11d1 and accommodate within the arcuate recessed portion 30d formed in the other side of the recording medium protective cartridge 30a as shown in FIG. 4. At this time, the stopper portion 11g is always urged to rotate in the direction shown by the arrow G by the leaf spring 11g1 and is restricted not to rotate in the direction of the arrow H since the pin 11g2 is in abutment with the shaft portion 11d. Therefore, the pin 11g2 stays in the recessed portion 30d, so that the recording medium 30 is positioned at a predetermined position against the urging force in the unloading direction D by the spring portion 11c acting through the engaging portion 11b.

Even when an external force in the direction of an arrow L shown in FIG. 6 is exerted on the button portion 11h projected from the panel surface 3, the button portion 11h elastically deforms as shown by dotted lines, so that the button portion 11h would not be damaged and moreover the shaft portion 11d is protected against damages.

The unloading operation of the recording medium 30 will now be described. When the projecting end of the button portion 11h projected from the panel surface 3 with the recording medium 30 loaded as shown in FIG. 4 is depressed, the shaft portion 11d is moved in the loading direction C against the spring force in the unloading direction D of the spring portion 11e. When the button portion 11h is depressed in the loading direction C, the button portion 11h is slightly compressed and elastically deformed in the loading direction C, but the shaft portion 11d is moved without any problem.

When the button portion 11h is further depressed to move the shaft portion 11d until the recessed portion 11d1 opposes to the pin 11g2 of the stopper portion 11g, the stopper portion 11g rotates in the direction of the arrow H to place the pin 11g2 within the recessed portion 11d1.

Thus, since the recording medium 30 loaded within the FDD is subjected to a biasing force in the loading direction D of the spring portion 11c through the pawl portion 11b1, the recording medium 30 is always urged in the loading direction D so that the recessed portion 30d always urges the stopper portion 11h to rotate in the direction shown by the arrow H, so that the stopper portion 11g is rotated in the direction shown by the arrow H to accommodate the pin 11g2 the recessed portion 11d1. This results in the release of the positioned state of the recording medium 30 and the recording medium 30 is moved in the direction shown by the arrow D by the spring force of the spring portion 11c through the engaging portion 11b.

Also, when the recording medium 30 is moved into the unloading direction D, the pressing force acting on the latch pin 11f3 in the loading direction C and applied from the recording medium protective cartridge 30a is removed, resulting in the rotation of the latch restriction plate 11f2 in the direction of the arrow E by the spring force of the spring portion 11f5. The rotation of the latch restriction plate 11f2 in the direction of the arrow E causes the latch pin 11f3 to abut against the end on the unloading direction D side of the elongated hole 11f4 to press the latch pawl portion 11f1 in the direction of the arrow F. The latch pawl portion 11f1 is rotated by the pressing force from the latch pin 11g3 in the direction of the arrow F to engage the notch portion 11d3 so that the movement of the shaft portion 11d is restricted as shown in FIG. 3.

As has been described, according to this embodiment of the flexible magnetic disc apparatus 1 of the present invention, the button portion 11h which projects by a predetermined length upon the loading of the recording medium 30 is made of an elastic member capable of being elastically deformed in a direction other than the loading direction C. Therefore, even when an unnecessary external force is exerted on the button portion 11h from a direction other than the loading direction C, the button portion 11h easily elastically deforms and no damage is caused. Also the button portion 11h is made of rubber, so that the elastically deformable button portion 11h can be realized with a simple structure.

Also, since the button portion 11h elastically deforms when an unnecessary external force is applied to the button portion 11h, the shaft portion 11d is not adversely affected, generating no damage to the shaft portion 11d and no adverse affect to the smooth movement of the shaft portion 11d.

Figure 11A:
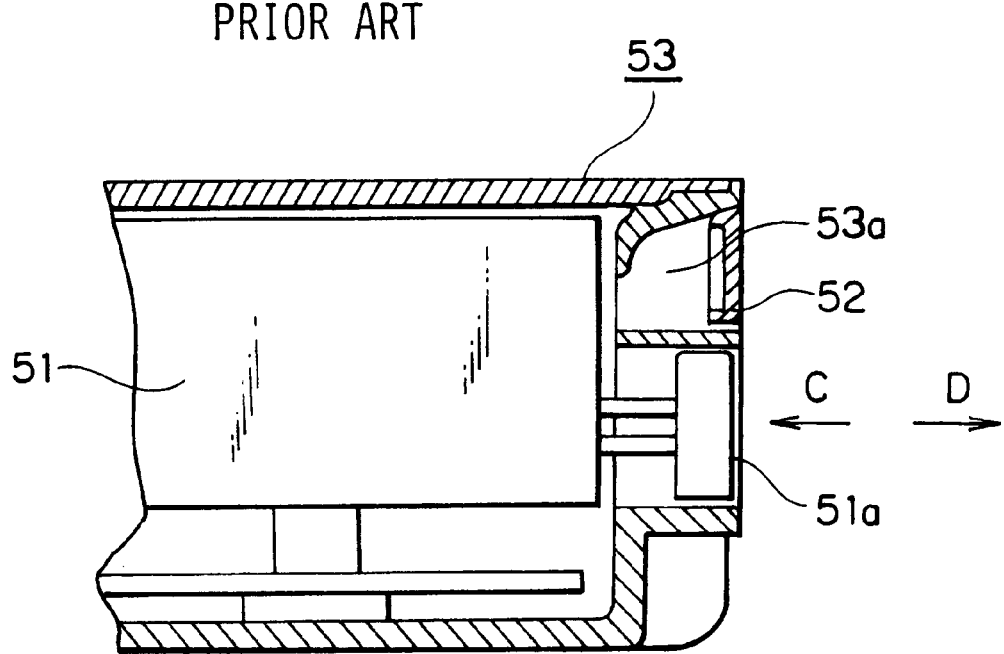
FIG. 11a is a fragmental sectional view of the flexible magnetic disc apparatus showing the position of the button portion after the recording medium is loaded.
Figure 11B:
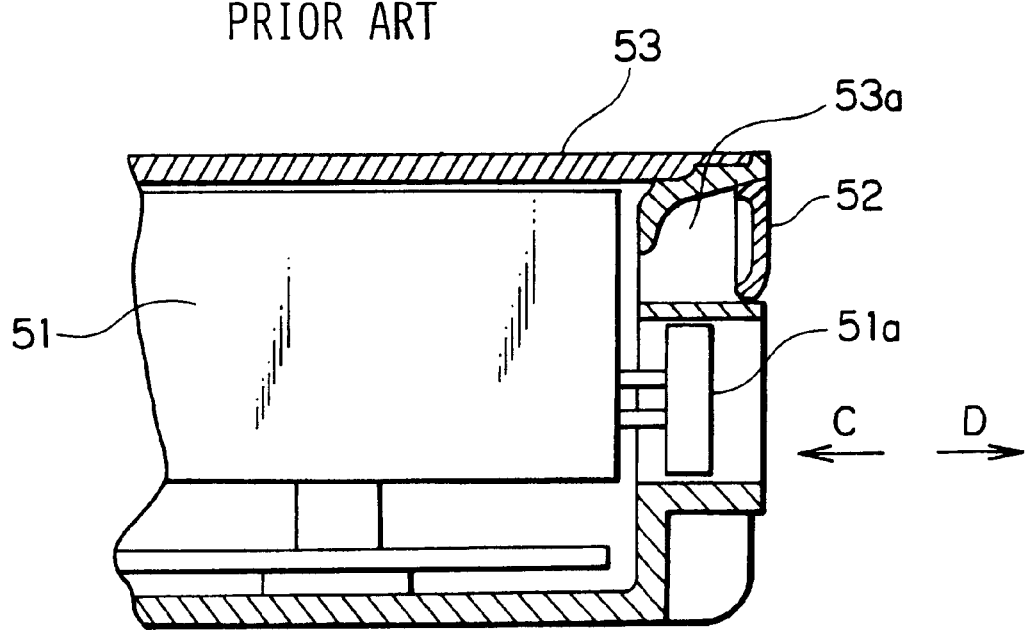
FIG. 11b is a fragmental sectional view of the flexible magnetic disc apparatus showing the position of the button portion before the recording medium is loaded.

Also, even when an unnecessary external force is applied to the button portion 11h when the FDD 1 is in the process of recording the information on the recording medium 30 or reproducing the recorded information, the button portion 11h elastically deforms so as not to adversely affect the shaft portion 11d and cause the recording medium 30 to be unloaded, whereby the cover 52 or the FDD protective space 53a illustrated in FIG. 11 as used in the conventional design are not needed, allowing the decrease of the size of the apparatus.

Further, the button portion 11h is formed with the rubber material having a rubber hardness Hs of a range of 80–100, the dimensions of the button portion 11h may be within the ranges of a diameter of 1.0 mm–3.0 mm and a length of projection from the panel surface 3 (i.e., the length of the unloading direction D) of 3.0 mm–5.0 mm, so that the area for pushing the button portion 11h in the loading direction C can be made relatively small and that the projection length of the button portion 11h necessary for unloading the recording medium 30 can be ensured, and the FDD 1 can be made small-sized.

When a rubber hardness and the dimensions are selected within the above range, the button portion 11h, when pushed into the loading direction C, can effectively transmit the pushing force to the shaft portion 11d to enable a smooth unloading of the recording medium 30. When the button portion 11h is pushed in another direction, it elastically deforms in that direction other than the loading direction C so that the button portion 11h can be prevented from being damaged by an unnecessary external force.

Also, when the button portion 11h is to be formed by rubber having a rubber hardness Hs of 90–95, the dimensions may be selected to have a diameter of about 2.0–2.5 mm and a length of projection from the panel surface 3 of about 3.5–4.5 mm, so that the area for pushing the button portion 11h in the loading direction C can be made small and optimized as well as a projection length of the button portion 11h necessary for unloading the recording medium 30 can be ensured, and the FDD 1 can be further small-sized.

When the rubber hardness and the button portion 11h is pressed in the loading direction C, the pressing force is effectively transmitted to the shaft portion 11d and, when the button portion 11h is pressed in a direction other than the loading direction C, the button portion 11h can be easily elastically deformed in that direction other than the loading direction C, the button portion 11h can be prevented from being damaged by an unnecessary external force.

It is to be noted that since the button portion 11h of this embodiment has a rubber hardness Hs of 90–95 and a diameter of 2.2 mm and a length in the direction of projection of 4.0 mm, the unloading operation of the recording medium 30 can be most smoothly achieved and the thickness of the FDD 1 can be made in the order of 5 mm.

Figure 7:
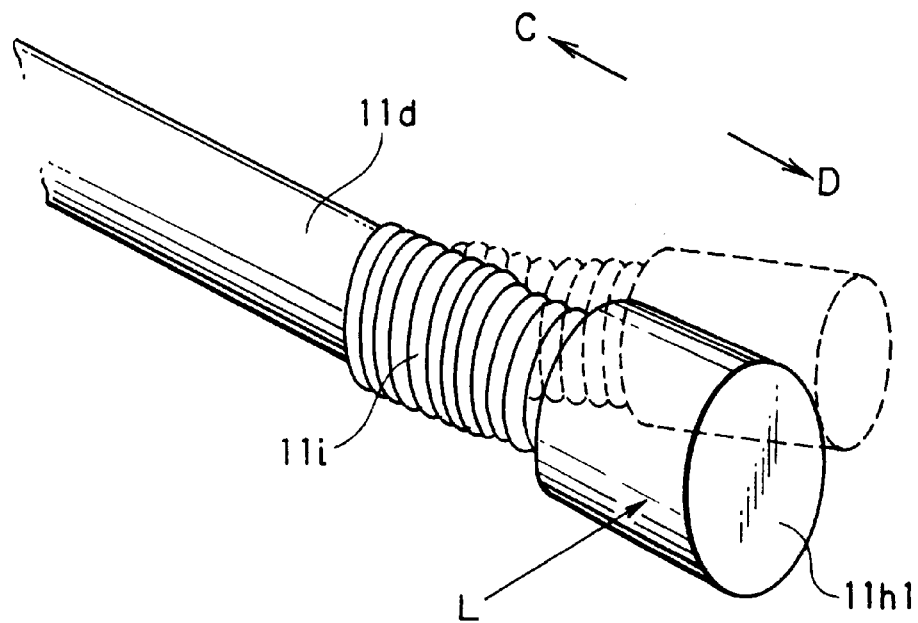
FIG. 7 is an explanatory perspective view of another button portion.

The operation will now be made as to another embodiment of the flexible magnetic disc apparatus of the present invention. FIG. 7 is an explanatory perspective view of another button portion protected against the damage. In the figure, the same reference numerals designate the components identical or corresponding to those shown in FIG. 6 so that their explanation will be omitted.

The reference numeral 11h1 is a button portion made of rubber having a diameter of 2.2 mm, a length in the projection direction (i.e., the unloading direction D) of about 2.0 mm and a rubber hardness Hs of 80–100. Reference numeral 11i is a cylindrically wound compression coil spring portion which is an elastic member capable of being elastically deformed in a direction other than the loading direction C, the spring portion having its cylinder central axis in substantial coincidence with the axis of movement of the shaft 11d, one end thereof being secured to the unloading direction D side end portion of the shaft portion 11d and the other end thereof being secured to the button portion 11h1.

The operation will now be described in conjunction with the drawings. When the recording medium 30 (not illustrated) is to be unloaded, the button portion 11h1 is depressed in the loading direction C. Since the cylindrical coil spring is of the compression type, no substantial deformation is observed and the pressing force is transmitted to the shaft portion 11d to move it into the loading direction C. The subsequent operation until the recording medium 30 is unloaded is similar to that of the loading mechanism portion 11 shown in FIGS. 3 and 4 so that its explanation will be omitted.

Also, as shown in FIG. 7, even if an unnecessary external force in the direction of L is applied to the cylindrical coil spring portion 11i or the button portion 11h1, it is elastically displaced as shown by the dotted line due to the cylindrical coil spring portion 11i, so that the button portion 11h1 can be prevented from being damaged and no adverse effect is applied to the shaft portion 11d so that the shaft portion 11d can be prevented from being damaged and the smooth movement of the shaft portion 11d is not adversely affected.

Further, even when an unnecessary external force is applied to the button portion 11h1 or the cylindrical coil spring portion 11i when the FDD 1 (see FIG. 1) is recording the information on the recording medium 30 or reproducing the recorded information, the cylindrical coil spring portion 11i is elastically deformed and applies no influence on the shaft portion 11d, so that the recording medium 30 is not unloaded and eliminates the need for the provision of the conventional cover 52 and the FDD protective space 53a shown in FIG. 11, realizing the small-sized apparatus.

Figure 8:
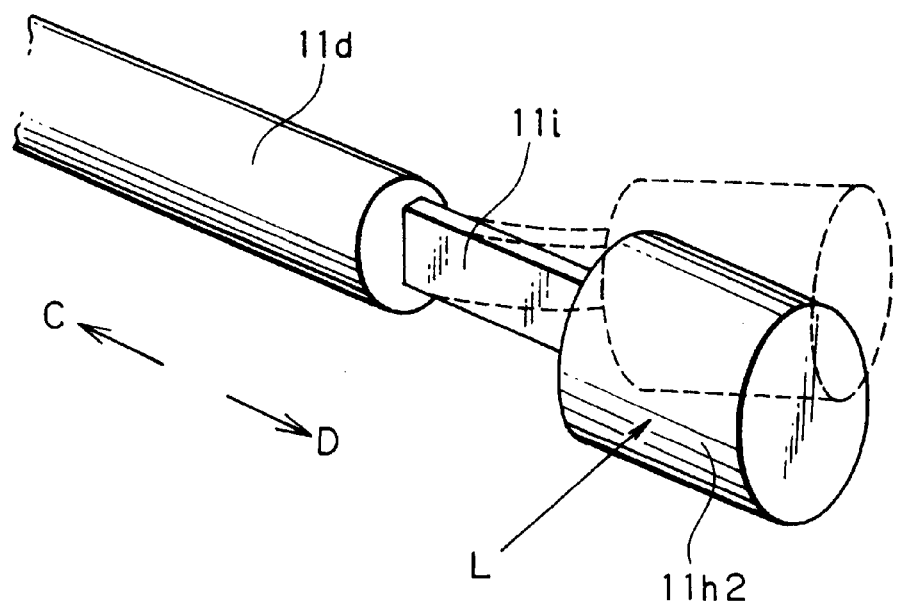
FIG. 8 is an explanatory perspective view of another button portion.

FIG. 8 is an explanatory perspective view of a still another embodiment of the button portion of the flexible magnetic disc apparatus of the present invention. In the figure, the reference numerals same as those in FIGS. 6 or 7 designate identical or corresponding components and their explanation will be omitted.

The reference numeral 11h1 is a button portion made of rubber having a diameter of 2.2 mm, a length in the projection direction (i. e., the unloading direction D) of about 2.0 mm and a rubber hardness Hs of 80–100. 11i is a leaf spring or an elastic member elastically deformable in the direction other than the loading direction C, having one end thereof secured to the unloading direction D side of the shaft portion 11d and the other end secured to the button portion 11h1.

The operation will now be described. When the recording medium 30 (not shown) is to be unloaded, the button portion 11h1 is depressed to the loading direction C. The leaf spring 11j does not substantially deform and transmits the pressing force to the shaft portion 11d to move it into the loading direction C. Thereafter, the operation of the recording medium 30 is similar to the operation of the loading mechanism portion 11 shown in FIGS. 3 and 4, so that its explanation will be omitted.

Also, even when an unnecessary external force in the direction of L is applied to the leaf spring portion 11j or the button portion 11h1 as shown in FIG. 8, the leaf spring portion 11j elastically deforms as shown by the dotted lines, preventing the button portion 11h1 from being damaged, and the shaft portion 11d is not adversely affected, preventing the shaft portion 11d from being damaged and a smooth movement of the shaft portion 11d is ensured.

Further, even when an unnecessary external force is applied to the button portion 11h1 or the leaf spring portion 11j when the FDD 1 (see FIG. 1) is recording the information on the recording medium 30 or reproducing the recorded information, the leaf spring portion 11j is elastically deformed and applies no influence on the shaft portion 11d, so that the recording medium 30 is not unloaded and eliminates the need for the provision of the conventional cover 52 and the FDD protective space 53a shown in FIG. 11, realizing the small-sized apparatus.

While the button portion 11h1 is made of a rubber having a rubber hardness Hs of 80–100 in the second or the third embodiments, the present invention is not limited to this and a material having a higher rigidity such as metal or plastic may also be utilized.

As has been described, the flexible magnetic disc apparatus of the present invention comprises a magnetic head portion for recording and reproducing information with respect to a disc-shaped recording medium, a carriage portion for positioning the magnetic head portion at a predetermined track position of the recording medium, a frame having a medium loading portion for loading the recording medium thereon, a medium driving motor for rotating the recording medium; and a loading mechanism portion for loading and unloading the recording medium and having a button portion which, when the recording medium is loaded in the loading mechanism portion, projects from a panel surface of the flexible magnetic disc apparatus in a first direction by a predetermined length and which, when depressed in a second direction opposite to the first direction, causes the loading mechanism portion to unload the recording medium, the button portion being an elastic member capable of being elastically deformed in a direction other than said first direction, so that even when an unnecessary external force is applied the button portion easily deforms and does not damage.

Also according to the flexible magnetic disc apparatus of the present invention, the button portion is made of rubber, so that the button portion is made elastically deformable and the button portion will not be broken.

Also according to the flexible magnetic disc apparatus of the present invention, the button portion is made of rubber having a rubber hardness of a range of from 80 to 100, so that dimensions of the button portion for depressing the button portion in the direction opposite to the projection direction can be made relatively small and the apparatus can be made small-sized.

Also according to the flexible magnetic disc apparatus of the present invention, the button portion is a cylindrical member having a diameter of from 1.0 mm to 3.0 mm and a central axis extending along a first direction, a distance of projection of a button portion is from 3.0 mm to 5.0 mm, so that the pressing surface and the projecting length dimensions of the button portion for pressing the button portion in the direction opposite to the projection direction and, when pressed in the direction opposite to the direction of projection, the unloading operation of the recording medium can be smoothly achieved through the use of that pressing force and, when pressed in a direction other than that direction, it elastically deforms in that direction and the button portion is prevented from being damaged by the unnecessary external force.

According to the flexible magnetic disc apparatus of the present invention, the button portion is made of rubber having a rubber hardness of a range of from 90 to 95, so that the dimensions of the button portion for depressing the button portion in the direction opposite to the projection direction can be made small and optimized and the apparatus can be made small-sized.

Also, according to the flexible magnetic disc apparatus of the present invention, the button portion is a cylindrical member having a diameter of from 2.0 mm to 2.5 mm and a central axis extending along the first direction, a distance of projection of the button portion is from 3.5 mm to 4.5 mm, so that the pressing surface and the projecting length dimensions of the button portion for pressing the button portion in the direction opposite to the projection direction and, when pressed in the direction opposite to the direction of projection, the unloading operation of the recording medium can be smoothly achieved through the use of that pressing force and, when pressed in a direction other than that direction, it elastically deforms in that direction and the button portion is prevented from being damaged by the unnecessary external force.

Also according to the present invention, the flexible magnetic disc apparatus comprises a magnetic head portion for recording and reproducing information with respect to a disc-shaped recording medium, a carriage portion for positioning the magnetic head portion at a predetermined track position of the recording medium, a frame having a medium loading portion for loading the recording medium thereon, a medium driving motor for rotating the recording medium, and a loading mechanism portion for loading and unloading the recording medium and having a button portion which, when the recording medium is loaded in the loading mechanism portion, projects from a panel surface of the flexible magnetic disc apparatus in a first direction by a predetermined length and which, when depressed in a second direction opposite to the first direction, causes the loading mechanism portion to unload the recording medium, the loading mechanism portion comprising a shaft portion supported from the frame and movable in the first direction and an elastic member secured at its one end to a projecting end of the shaft portion and secured at its the other end to the button portion and capable of being elastically deformed in a direction other than the first direction, so that, even when an external force is exerted to the button portion from the direction other than the projection direction, the button portion can be prevented from being damaged because the elastic member is easily deformable in that direction.

Also according to the flexible magnetic disc apparatus of the present invention, the elastic member comprises a spring having one end secured to the projecting end of the shaft portion and the other end secured to the button portion, so that the elastic deformation can be achieved by a simple structure to prevent the button portion from being damaged.

Also according to the flexible magnetic disc apparatus of the present invention, the elastic member comprises a cylindrical coil spring having its central axis in alignment with a shaft of movement of the shaft portion and having one end secured to the projecting end of the shaft portion and the other end secured to the button portion, so that the elastic deformation in various directions can be achieved by a simple structure to prevent the button portion from being damaged.

According to the flexible magnetic disc apparatus of the present invention, the elastic member comprises a leaf spring having one end secured to the projecting end of the shaft portion and the other end secured to the button portion, so that the elastic deformation can be achieved by a simple structure to prevent the button portion from being damaged.

What is claimed is:

1. A flexible magnetic disc apparatus comprising:
   a magnetic head portion for recording and reproducing information with respect to a disc-shaped recording medium;
   a carriage portion for positioning said magnetic head portion at a predetermined track position of said recording medium;
   a frame having a medium loading portion for loading said recording medium thereon;
   a medium driving motor for rotating said recording medium; and
   a loading mechanism portion for loading and unloading said recording medium and having a button portion which, when said recording medium is loaded in said loading mechanism portion, projects from a panel surface of said flexible magnetic disc apparatus in a first direction by a predetermined length and which, when depressed in a second direction opposite to said first direction, causes said loading mechanism portion to unload said recording medium;
   said button portion being an elastic rubber member capable of being elastically deformed in a direction other than said first direction.

2. A flexible magnetic disc apparatus as claimed in claim 1, wherein said elastic rubber member has a rubber hardness of a range of from 80 to 100.

3. A flexible magnetic disc apparatus as claimed in claim 2, wherein said button portion is a cylindrical member having a diameter of from 1.0 mm to 3.0 mm and a central axis extending along said first direction, a distance of projection of said button portion is from 3.0 mm to 5.0 mm.

4. A flexible magnetic disc apparatus as claimed in claim 1, wherein said button portion is made of rubber having a rubber hardness of a range of from 90 to 95.

5. A flexible magnetic disc apparatus as claimed in claim 4, wherein said button portion is a cylindrical member having a diameter of from 2.0 mm to 2.5 mm and a central axis extending along said first direction, a distance of projection of said button portion is from 3.5 mm to 4.5 mm.

6. A flexible magnetic disc apparatus comprising:
   a magnetic head portion for recording and reproducing information with respect to a disc-shaped recording medium;
   a carriage portion for positioning said magnetic head portion at a predetermined track position of said recording medium;
   a frame having a medium loading portion for loading said recording medium thereon;
   a medium driving motor for rotating said recording medium; and
   a loading mechanism portion for loading and unloading said recording medium and having a button portion which, when said recording medium is loaded in said loading mechanism portion, projects from a panel surface of said flexible magnetic disc apparatus in a first direction by a predetermined length and which, when depressed in a second direction opposite to said first direction, causes said loading mechanism portion to unload said recording medium;
   said loading mechanism portion comprising a shaft portion supported from said frame and movable in said first direction and an elastic member secured at its one end to a projecting end of said shaft portion and secured at its the other end to said button portion and capable of being elastically deformed in a direction other than said first direction.

7. A flexible magnetic disc apparatus as claimed in claim 6, wherein said elastic member comprises a spring having one end secured to the projecting end of said shaft portion and the other end secured to said button portion.

8. A flexible magnetic disc apparatus as claimed in claim 7, wherein said elastic member comprises a leaf spring having one end secured to the projecting end of said shaft portion and the other end secured to said button portion.

9. A flexible magnetic disc apparatus as claimed in claim 6, wherein said elastic member comprises a cylindrical coil spring having its central axis in alignment with a shaft of movement of said shaft portion and having one end secured to the projecting end of said shaft portion and the other end secured to said button portion.

10. A flexible magnetic disc apparatus comprising:
    a loading mechanism having a button portion which projects from a panel surface of said flexible magnetic disc apparatus in a first direction by a predetermined length when a recording medium is loaded into said flexible magnetic disc apparatus, said button portion being an elastic rubber member capable of being elastically deformed in a direction other than the first direction and causing unloading of the recording medium when depressed in a direction substantially opposite to the first direction.

11. A flexible magnetic disc apparatus as claimed in claim 10, wherein said elastic rubber member has a rubber hardness of a range from 80 to 100.

12. A flexible magnetic disc apparatus as claimed in claim 10, wherein said elastic rubber member has a rubber hardness of a range from 90 to 95.

13. A flexible magnetic disc apparatus as claimed in claim 10, wherein said elastic rubber member is a cylindrical member having a diameter of from 1.0 mm to 3.0 mm and a central axis extending along the first direction, a distance of projection of said button portion being from 3.0 mm to 5.0 mm.

14. A flexible magnetic disc apparatus as claimed in claim 10, wherein said elastic rubber member is a cylindrical member having a diameter of from 2.0 mm to 2.5 mm and a central axis extending along the first direction, a distance of projection of said button portion being from 3.5 mm to 4.5 mm.

15. A flexible magnetic disc apparatus as claimed in claim 10, said flexible magnetic disc apparatus having a width of about 55 mm, a length of about 90 mm and a thickness of about 5 mm.

16. A flexible magnetic disc apparatus as claimed in claim 10, wherein the recording medium is housed in a recording medium protective cartridge having a width of about 47 mm, a length of about 50 mm and a thickness of about 2 mm.

17. A flexible magnetic disc apparatus comprising:

a loading mechanism having a button portion which projects from a panel surface of said flexible magnetic disc apparatus in a first direction by a predetermined length when a recording medium is loaded into said flexible magnetic disc apparatus, said button portion causing unloading of the recording medium when depressed in a direction substantially opposite to the first direction, said loading mechanism including a shaft portion movable in the first direction and connected to said button portion by an elastic member capable of being elastically deformed in a direction other than the first direction.

18. A flexible magnetic disc apparatus as claimed in claim 17, wherein said elastic member is a spring.

19. A flexible magnetic disc apparatus as claimed in claim 17, said flexible magnetic disc apparatus having a width of about 55 mm, a length of about 90 mm and a thickness of about 5 mm.

* * * * *